C. C. DENNIS.
Harvester Rake.
No. 38,219.
Patented April 21, 1863.
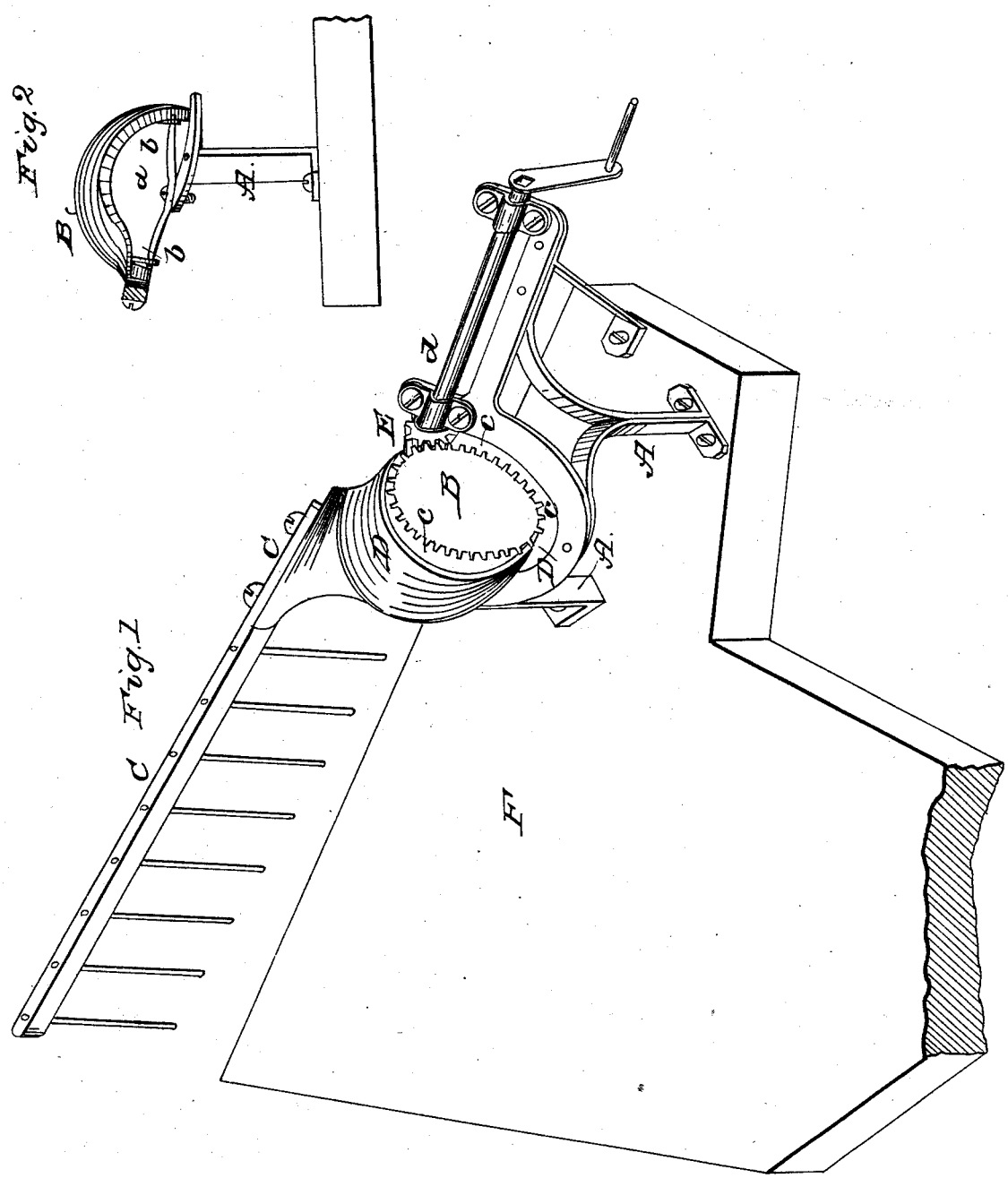
Witnesses
P E Wilson
E Evans Jr
Inventor
C. C. Dennis
By atty. A B Stoughton

UNITED STATES PATENT OFFICE.

CYRUS C. DENNIS, OF AUBURN, NEW YORK.

IMPROVEMENT IN RAKES FOR HARVESTERS.

Specification forming part of Letters Patent No. 38,219, dated April 21, 1863.

*To all whom it may concern:*

Be it known that I, CYRUS C. DENNIS, of Auburn, in the county of Cayuga and State of New York, have invented certain new and useful Improvements in Rakes for Harvesting-Machines; and I do hereby declare the following to be a full, clear, and exact description of the same, reference being had to the accompanying drawings, making a part of this specification, in which—

Figure 1 represents a perspective view of the rake. Fig. 2 represents the mode of swiveling the spherical gear to the standard to admit of its rotation or motion.

My invention consists, first, in placing an irregular gear on the surface of a segment of a sphere of such a form or shape as will produce the necessary rake motions—viz., forward, backward, upward, and downward; second, in the use of a groove of substantially the same form as the irregular gear, to serve as a guide for the pinion that runs in the irregular gear; third, in supporting the segment of the sphere at its center by a hinged connection, to allow it to move into such positions as the pinion and irregular gear may carry it.

To enable others skilled in the art to make and use my invention, I will proceed to describe the same with reference to the drawings.

On a bracket or post, A, is hung, by a swiveling pin, a, a semi-sphere or segment of a sphere, B, to which the rake head or stale C is fastened, said sphere and rake-head or stale being also hinged to the swiveling pin a, as shown at b, so that both may turn around with the swiveling pin, and also raise up or descend by the joint b, as the case may be. On the rear portion of the sphere or segment of a sphere, B, there is a gear, c, of irregular form, which is somewhat flat on its longest sides, but quite abrupt at its ends, the purpose of its irregular form being to raise and lower the rake quickly, while in moving over the platform, or returning, it may maintain its horizontality. The ends of the gears c or teeth or cogs, or whatever they may be termed, are parallel to the surface of the sphere. The front portion of the sphere need not be solid, nor, indeed, need it be spherical, as any other form or shape will serve that will hold the rake-head or stale C to the gear. A groove, D, is formed in the sphere in close proximity to the gear c, and of the same irregular form or shape as the gears. In this groove the end of the pinion-shaft d runs, the groove acting as a guide to the pinion E, while it (the pinion) works into the irregular gear c, and gives the sphere its motions, and which motions give to the rake a rising and falling and backward and forward motion. I have shown the groove D as placed outside of the gear c. It may be inside of the groove, or anywhere in such proximity to it, or to the pinion or pinion-shaft, as will serve the purpose of a guide to said pinion or pinion-shaft, without changing the characteristics of the invention. By this gear c and pinion E, and the swivel-joints a b, I get all the required motions of a rake over and on the platform F.

Having thus fully described the nature of my invention, what I claim therein as new, and desire to secure by Letters Patent, is—

1. The use of an irregular gear on the surface of a sphere or segment of a sphere, for the purpose, in connection with a pinion, of getting four rake motions, as herein described and represented.

2. In combination with the irregular gear, an irregular-shaped groove conforming thereto, as a guide for the pinion, substantially as described.

3. Supporting the sphere or segment thereof at its center by a swiveling and hinged connection, in the manner and for the purpose substantially as set forth.

C. C. DENNIS.

Witnesses:
CHAS. H. GARLOCK,
JNO. H. OSBORNE.